(12) United States Patent
Park et al.

(10) Patent No.: US 11,907,473 B2
(45) Date of Patent: Feb. 20, 2024

(54) DISPLAY DEVICE AND METHOD OF DRIVING THE SAME

(71) Applicant: Samsung Display Co., LTD., Yongin-si (KR)

(72) Inventors: Jae Hyun Park, Yongin-si (KR); Sang Kook Kim, Yongin-si (KR); Tae Joon Kim, Yongin-si (KR); Hyung Bae Kim, Yongin-si (KR); Ji Yeong Lee, Yongin-si (KR); Hyun Jae Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/833,815

(22) Filed: Jun. 6, 2022

(65) Prior Publication Data

US 2023/0106322 A1 Apr. 6, 2023

(30) Foreign Application Priority Data

Oct. 5, 2021 (KR) ........................ 10-2021-0131958

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01); *G06F 3/04164* (2019.05); *G06F 3/0418* (2013.01)

(58) Field of Classification Search
None
See application file for complete search history.

(56) References Cited

U.S. PATENT DOCUMENTS

| 9,250,735 B2 | 2/2016 | Kim et al. |
| 10,007,380 B2 | 1/2018 | Yoon et al. |
| 2021/0349600 A1* | 11/2021 | Chen ..................... G06F 3/0446 |
| 2023/0067179 A1* | 3/2023 | Kim ........................ H02J 50/12 |

FOREIGN PATENT DOCUMENTS

| KR | 10-1452302 | 10/2014 |
| KR | 10-1457743 | 11/2014 |

* cited by examiner

*Primary Examiner* — Stephen T. Reed
(74) *Attorney, Agent, or Firm* — H.C. Park & Associates, PLC

(57) ABSTRACT

A display device includes a display panel configured to display an image, a sensing panel configured to at least partially overlap the display panel and that includes a sensing area and a non-sensing area, a sensing panel controller configured to drive the sensing panel, a plurality of sensing electrodes disposed in the sensing area, and a plurality of sensing lines electrically connected to the plurality of sensing electrodes, respectively. The sensing panel controller is configured to apply the same sensing voltage to each of the plurality of sensing lines or to apply a reference voltage different from the sensing voltage to at least some sensing lines among the plurality of sensing lines.

16 Claims, 14 Drawing Sheets

DISPLAY DEVICE AND METHOD OF DRIVING THE SAME

CROSS REFERENCE TO RELATED APPLICATION

This application claims priority from and the benefit of Korean Patent Application No. 10-2021-0131958, filed on Oct. 5, 2021, which is hereby incorporated by reference for all purposes as if fully set forth herein.

BACKGROUND

Field

Embodiments of the invention relate generally to a display device and a method of driving the same, and more particularly, to a display device including a sensing panel and a method of driving the same.

Discussion of the Background

With development of information technology, importance of a display device, which is a connection medium between a user and information, is being highlighted. In response to this, use of a display device such as a liquid crystal display device and an organic light emitting display device is increasing.

The display device may receive a user's touch input, an active pen input, and the like by including capacitive sensors in a display area. The capacitive sensors may be divided into a sensing method using a mutual capacitance of two or more sensors and a sensing method using a self-capacitance of each sensor.

In the mutual capacitance method, a plurality of touch electrodes disposed in a row and a columns are grouped in a unit of the row and the column and are driven, and thus there is little spatial restriction in designing signal lines and pads for driving a touch sensor. However, as the display device becomes larger, an RC delay problem has emerged, and a self-capacitance method is recognized as an alternative to solve the RC delay problem.

The above information disclosed in this Background section is only for understanding of the background of the inventive concepts, and, therefore, it may contain information that does not constitute prior art.

SUMMARY

An inventive feature consistent with one or more embodiments provides for a display device capable of improving sensing accuracy and a method of driving the same.

Additional features of the inventive concepts will be set forth in the description that follows, and in part will be apparent from the description, or may be learned by practice of the inventive concepts.

According to an embodiment, a display device includes a display panel configured to display an image, a sensing panel that at least partially overlaps the display panel and that includes a sensing area and a non-sensing area, a sensing panel controller configured to drive the sensing panel, a plurality of sensing electrodes disposed in the sensing area, and a plurality of sensing lines electrically connected to the plurality of sensing electrodes, respectively. The sensing panel controller is configured to apply the same sensing voltage to each of the plurality of sensing lines or applies a reference voltage different from the sensing voltage to at least some sensing lines among the plurality of sensing lines.

The sensing panel controller may apply the reference voltage to the at least some sensing lines in response to a position of the sensing area.

The plurality of sensing lines may be positioned to extend in one direction in the sensing area and the non-sensing area.

The sensing area may include a first sensing area, a second sensing area, and a third sensing area divided in a direction perpendicular to a direction in which the plurality of sensing lines are dense, and the sensing panel controller may sequentially divide and drive the first sensing area, the second sensing area, and the third sensing area.

The plurality of sensing lines may include a first sensing line, a second sensing line, and a third sensing line electrically connected to sensing electrodes corresponding to the first sensing area, the second sensing area, and the third sensing area.

The sensing panel controller may apply the sensing voltage to the first sensing line corresponding to the first sensing area and apply the reference voltage to remaining sensing lines.

The sensing panel controller may apply the sensing voltage to the second sensing line corresponding to the second sensing area and apply the reference voltage to the remaining sensing lines.

The sensing panel controller may apply the sensing voltage to the third sensing line corresponding to the third sensing area and apply the reference voltage to the remaining sensing lines.

The sensing panel controller may apply the same sensing voltage to the plurality of sensing lines to check an initial position where a capacitance change occurs on the sensing area.

The sensing panel controller may determine whether the initial position where the capacitance change occurs in the sensing area corresponds to a plurality of positions, and when it is determined that the capacitance change occurs in the plurality of positions, the sensing panel controller may sequentially divide and drive the sensing area.

The sensing panel controller may sequentially divide and drive the sensing area, and when the capacitance change occurs in the same position as the initial position, the sensing panel controller may determine that an external input is applied to a portion where the plurality of sensing lines are dense.

The sensing panel controller may recognize a final sensing coordinate with reference to the initial position and a position of the portion where the plurality of sensing lines are dense.

According to an embodiment, a method of driving a display device, which includes a display panel displaying an image, a sensing panel that at least partially overlaps the display panel and that includes a sensing area and a non-sensing area, a sensing panel controller configured to drive the sensing panel, a plurality of sensing electrodes disposed in the sensing area, and a plurality of sensing lines electrically connected to the plurality of sensing electrodes, respectively, includes checking, by the sensing panel controller, an initial position where a capacitance change occurs on the sensing area, determining, by the sensing panel controller, whether the capacitance change occurs at a plurality of positions in the sensing area, checking, by the sensing panel controller, whether the capacitance change occurs at the same position as the initial position through division driving of the plurality of sensing electrodes, and recognizing, by the sensing panel controller, a final sensing coordinate in the sensing area.

When checking the initial position where the capacitance change occurs on the sensing area, the sensing panel controller may apply the same sensing voltage to the plurality of sensing electrodes.

When the sensing panel controller determines that the capacitance change occurs at one position of the initial position, the sensing panel controller may recognize the corresponding position as the final sensing coordinate.

When it is determined that the capacitance change occurs in the plurality of positions of the initial position, the sensing panel controller may sequentially divide and drive the plurality of sensing electrodes divided in a direction perpendicular to a direction in which the plurality of sensing lines are dense.

When the sensing panel controller determines that the capacitance change does not occur at the same position as the initial position through the division driving, the sensing panel controller may recognize the initial position as the final sensing coordinate.

When the sensing panel controller determines that the capacitance change occurs at the same position as the initial position through the division driving, the sensing panel controller may determine that the corresponding position is generated as an input is applied to a portion where the plurality of sensing lines are dense.

The sensing panel controller may recognize the final sensing coordinate with reference to the initial position and a position identified according to the division driving.

According to an embodiment, an error of inaccurately sensing an external input applied to a portion where the sensing lines are dense in the sensing area may be improved. Accordingly, sensing accuracy of the display device may be improved.

An effect according to an embodiment is not limited to the contents illustrated above, and more various effects are included in the embodiments as described hereinbelow.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
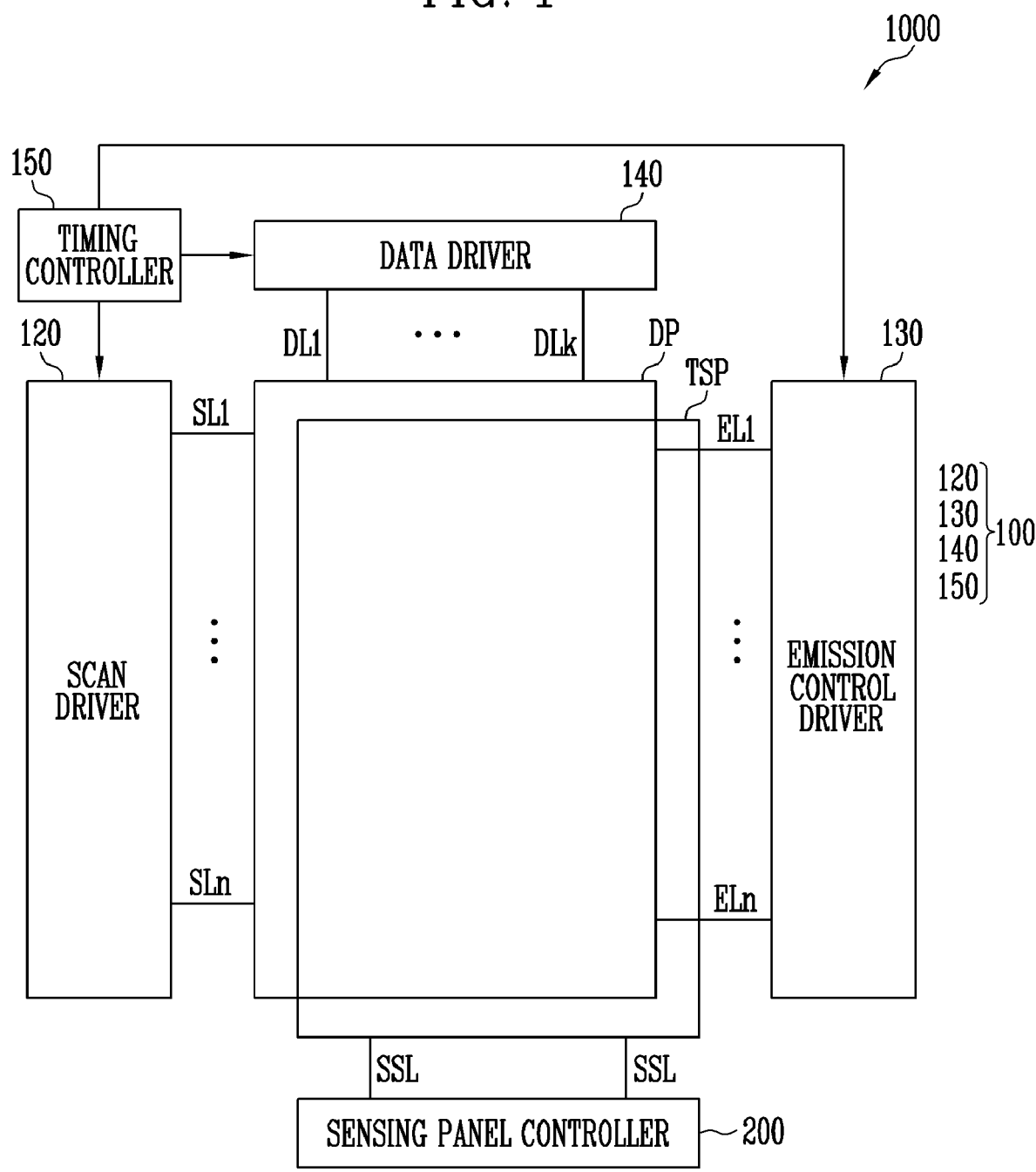
FIG. 1 is a block diagram illustrating a configuration of a display device according to an embodiment that is constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a display device and a method of driving the same according to an embodiment is described with reference to the drawings related to the embodiments as described hereinbelow.

Figure 2:
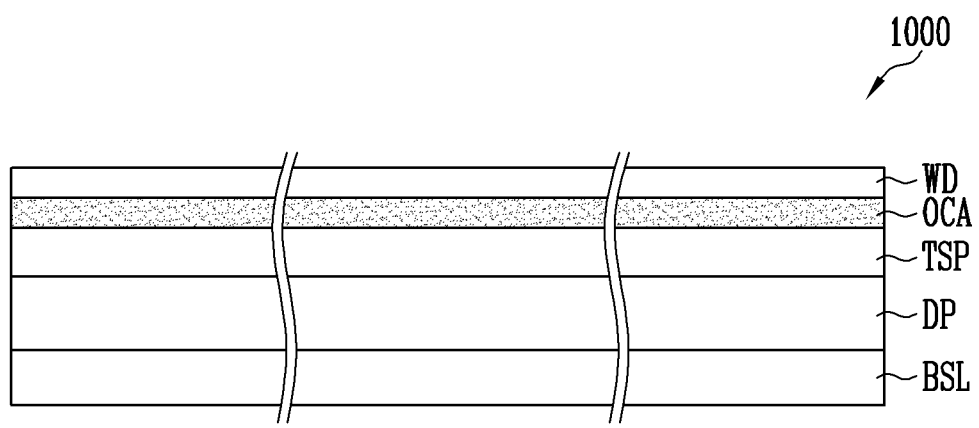
FIG. 2 is a cross-sectional view schematically illustrating a display device according to an embodiment.

FIG. 1 is a block diagram illustrating a configuration of a display device according to an embodiment that is constructed according to principle of the invention, and FIG. 2 is a cross-sectional view schematically illustrating a display device according to an embodiment.

Referring to FIG. 1, the display device 1000 according to an embodiment may include a display panel DP, a sensing panel TSP, a display panel driver 100, and a sensing panel controller 200.

The display panel DP may include a plurality of pixels for displaying an image. The plurality of pixels may be respectively connected to corresponding scan lines SL1 to SLn, data lines DL1 to DLk, and emission control lines EL1 to ELn. Here, the display panel DP is shown as a quadrangle, but the embodiment is not limited thereto. According to an embodiment, the display panel DP may be implemented in various shapes such as a circle, an ellipse, and a triangle.

The display panel driver 100 is for driving the display panel DP, and may include a scan driver 120, an emission control driver 130, a data driver 140, and a timing controller 150.

The scan driver 120 may supply a scan signal to the scan lines SL1 to SLn in response to a scan control signal, a clock signal, and the like received from the timing controller 150. In FIG. 1, the scan driver 120 is separated from the display panel DP, but according to an embodiment, the scan driver 120 may be mounted on a partial area of the display panel DP.

The emission control driver 130 may supply an emission control signal to the emission control lines EL1 to ELn in response to an emission stop signal, a clock signal, and the like received from the timing controller 150. According to an embodiment, the emission control driver 130 may be omitted according to a configuration of the pixel.

The data driver 140 may convert image data into a data voltage (or an analog data signal) in response to a data control signal and the like received from the timing controller 150, and supply the data voltage to the data lines DL1 to DLk.

The timing controller 150 may receive an input control signal and an input image signal from an image source such as an external graphic device. The timing controller 150 may generate image data suitable for an operation condition of the display panel DP and provide the image data to the data driver 140. The timing controller 150 may provide control signals suitable for respective specifications to the scan driver 120, the emission control driver 130, the data driver 140, and the like based on the input control signal.

The sensing panel TSP may at least partially overlap the display panel DP, and may include a sensing electrode, sensing lines SSL, and the like. A detailed configuration of the sensing panel TSP is described with reference to FIG. 3 to be described later. In addition, although the sensing panel TSP is shown in a quadrangular shape, the embodiment is not limited thereto. According to an embodiment, the sensing panel TSP may be implemented in various shapes such as a circle, an ellipse, and a triangle.

The sensing panel controller 200 may drive the sensing panel TSP. The sensing panel controller 200 may be electrically connected to the sensing panel TSP through the sensing lines SSL to supply a sensing signal to the sensing panel TSP and receive a sampling signal.

In an embodiment, the sensing panel controller 200 may apply the same sensing voltage to the sensing panel TSP through the sensing lines SSL. In addition, the sensing panel controller 200 may apply a reference voltage different from the sensing voltage to at least some of the sensing lines SSL. Here, the sensing lines SSL to which the reference voltage is applied may be different according to a position of a sensing area to be described later. A method of driving the sensing panel controller 200 is described in detail with reference to FIGS. 4 to 14 to be described later.

Referring to FIG. 2, the display device 1000 according to an embodiment may include a base layer BSL, the display panel DP, the sensing panel TSP, a transparent adhesive layer OCA, and a window WD.

The base layer BSL is a base member of the display device 1000 and may be a rigid or flexible substrate or film. In addition, the base layer BSL may be a rigid substrate formed of glass or tempered glass, a flexible substrate (or thin film) of a plastic or metal material, or at least one insulating layer, and a material and/or a physical property thereof are/is not particularly limited.

The display panel DP may display an image using a pixel circuit and a light emitting element disposed on the base layer BSL. For example, the light emitting element and the pixel circuit may be covered with a thin film encapsulation layer, and the thin film encapsulation layer may seal the light emitting element from an external environment including moisture and oxygen to suppress characteristic deterioration. The embodiment is not limited thereto, and the display panel DP may not include a thin film encapsulation layer, and may include an insulating layer formed of an inorganic or organic material to cover the light emitting element and the pixel circuit. In addition, the display panel DP may further include a color filter and a light conversion layer between the light emitting element and the insulating layer.

The sensing panel TSP may overlap the display panel DP, and may sense a user's input from the outside or sense user's finger fingerprint information. At this time, the user's input may include a direct input by a user's finger and an input by an electronic pen manipulated by the user. According to an embodiment, the sensing panel TSP may be manufactured separately from the display panel DP, and then disposed and/or combined so that at least one area overlaps each other. Alternatively, in another embodiment, the display panel DP and the sensing panel TSP may be integrally manufactured. For example, the sensing panel TSP may include at least one substrate configuring the display panel DP (for example, upper and/or lower substrates of the display panel, or a thin film encapsulation layer), or may be provided directly on other layers or various functional layers (for example, an optical layer or a protective layer).

The sensing panel TSP may be disposed on one surface of the display panel DP and may include sensing electrodes.

The window WD may be positioned on an upper surface of the display device 1000. The window WD may protect the display panel DP and/or the sensing panel TSP from an external impact, a scratch, and the like while transmitting the image of the display panel DP as it is. The window WD may include a transparent material having rigidity and flexibility. For example, the window WD may include ultra-thin glass (UTG) or colorless polyimide (PI) (CPI).

The transparent adhesive layer OCA may be positioned between the window WD and the sensing panel TSP to adhere the window WD and the sensing panel TSP. For example, the transparent adhesive layer OCA may be an optically transparent adhesive layer that fills a space between the window WD and the sensing panel TSP to prevent light loss and increase light transmittance. The embodiment is not limited thereto, and the transparent adhesive layer OCA may be replaced with various other adhesive materials.

FIG. 2 is a simplified (or exaggerated) diagram illustrating a stack relationship of elements configuring the display device 1000, and should be interpreted for describing a relative disposition relationship between components, and thicknesses or areas of each component should not be construed as limiting.

Hereinafter, a structure of a sensing panel according to an embodiment is described with reference to FIG. 3.

Figure 3:
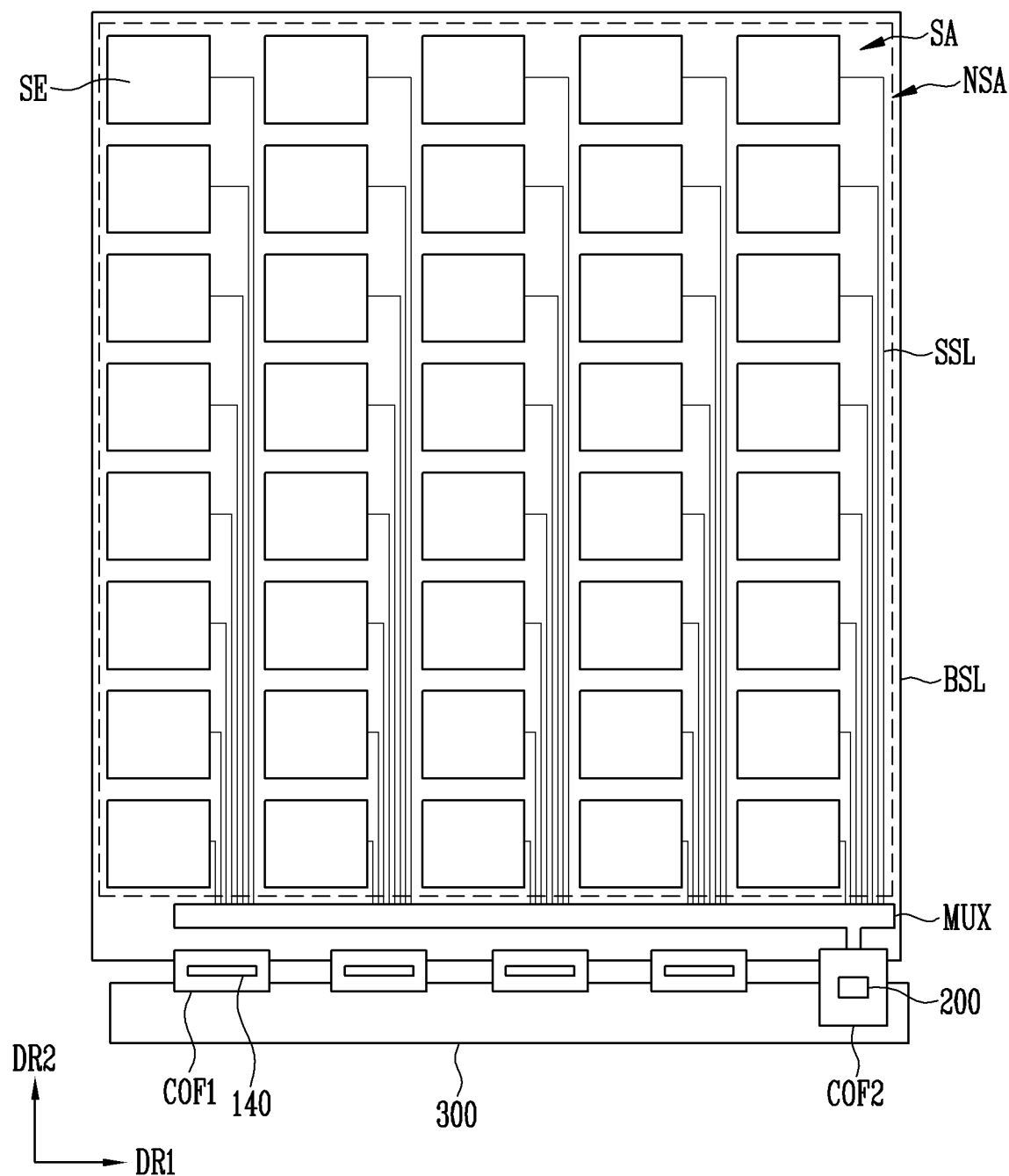
FIG. 3 is a plan view of a display device centered on a sensing panel according to an embodiment.

FIG. 3 is a plan view of a display device centered on a sensing panel according to an embodiment.

Referring to FIG. 3, the display device according to an embodiment may further include a first circuit film COF1, a second circuit film COF2, and a circuit board 300.

The data driver 140 (refer to FIG. 1) may be mounted on the first circuit film COF1, and the sensing panel controller 200 (refer to FIG. 1) may be mounted on the second circuit film COF2. Here, the data driver 140 and the sensing panel controller 200 may be implemented as an integrated circuit (IC). The first circuit film COF1 and the second circuit film COF2 are illustrative, and according to an embodiment, the data driver 140 and the sensing panel controller 200 may be mounted in a form of a chip on glass (COG).

The circuit board 300 may be electrically connected to the base layer BSL through the first circuit film COF1 and/or the second circuit film COF2. In addition, the circuit board 300 may be provided with the timing controller 150 (refer to FIG. 1). In an embodiment, the circuit board 300 may be implemented as a flexible printed circuit board (FPCB).

The sensing panel TSP may be disposed on the base layer BSL of the display device according to an embodiment.

The sensing panel TSP may include a plurality of sensing electrodes SE and a plurality of sensing lines SSL. In addition, the sensing panel TSP may include a sensing area SA in which the plurality of sensing electrodes SE are disposed and a non-sensing area NSA surrounding the sensing area SA. Here, the sensing area SA is shown in a quadrangular shape, but the embodiment is not limited thereto. According to an embodiment, the sensing area SA may be implemented in various shapes such as a circle, an ellipse, and a triangle to correspond to a shape of the sensing panel TSP.

The plurality of sensing electrodes SE may be disposed in the sensing area SA. The plurality of sensing electrodes SE may be dispersedly spaced apart from each other in the sensing area SA. For example, the sensing electrodes SE may be disposed in a matrix form along a column direction (for example, a first direction DR1) and a row direction (for example, a second direction DR2).

Although the plurality of sensing electrodes SE is shown in a quadrangular shape, the embodiment is not limited thereto. According to an embodiment, the plurality of sensing electrodes SE may be implemented in various shapes such as a circle, an ellipse, a triangle, and a rhombus.

The plurality of sensing lines SSL may be positioned across the sensing area SA and the non-sensing area NSA. The plurality of sensing lines SSL may be electrically connected to the plurality of sensing electrodes SE, respectively. Accordingly, the plurality of sensing lines SSL may supply the sensing voltage or the reference voltage provided from the sensing panel controller 200 to each of the sensing electrodes SE. The plurality of sensing lines SSL may include a first sensing line, a second sensing line, and a third sensing line electrically connected to the sensing electrodes SE corresponding to a first sensing area, a second sensing area, and a third sensing area, to be described later.

The plurality of sensing lines SSL may extend in the second direction DR2 and may be electrically connected to a multiplexer MUX. The multiplexer MUX may be electrically connected to the sensing panel controller 200 through the second circuit film COF2.

The sensing panel controller 200 may supply the sensing signal (or a sensing voltage) to the sensing electrodes SE to charge a charge in the sensing electrodes SE, and when a capacitance of the sensing electrodes SE is changed, presence or absence of an external input (or a position of the external input, that is, a sensing coordinate) may be determined by sensing the changed capacitance. That is, the sensing panel controller 200 may determine the presence or absence of the external input of the sensing panel TSP using a self-capacitance method.

The sensing panel controller 200 may identify an initial position where the capacitance change occurs on the sensing panel TSP (or the sensing area SA). Thereafter, the sensing panel controller 200 may determine whether the initial position where the capacitance change occurs in the sensing area SA corresponds to a plurality of positions, and when it is determined that the capacitance change occurs at the plurality of positions, the sensing panel controller 200 may check whether the capacitance change occurs at the same position as the first determined position, by sequentially dividing and driving the sensing electrodes SE (or the sensing areas SA). Thereafter, the sensing panel controller 200 may divide and drive the sensing electrodes SE, and when the capacitance change occurs at the same position as the first determined position (or the initial position), the sensing panel controller 200 may determine that corresponding positions occurs as an input is applied to a portion where the sensing lines SSL are dense. At this time, the sensing panel controller 200 may recognize a final sensing coordinate with reference to the initially identified position and the position identified according to the division driving. Accordingly, the display device according to an embodiment may improve an error of inaccurately sensing an external input applied to the portion of the sensing area SA where the sensing lines SSL are dense. Therefore, sensing accuracy of the display device may be improved.

Hereinafter, a method of driving a sensing panel according to an embodiment is described in detail with reference to FIGS. 4 to 8.

FIGS. 4 to 8 are diagrams illustrating a method of driving a sensing panel according to an embodiment.

Referring to FIGS. 4 to 8, the sensing panel TSP according to an embodiment may include a plurality of sensing electrodes SE and a plurality of sensing lines SSL disposed in the circular sensing area SA.

The plurality of sensing electrodes SE may be positioned to be spaced apart from each other, and may have different sizes and/or shapes to correspond to the circular sensing area SA. The sensing area SA may include a first sensing area SA1, a second sensing area SA2, and a third sensing area SA3. Here, the sensing area SA may be divided to be perpendicular to a direction (for example, a horizontal direction, or the first direction DR1) in which the plurality of sensing lines SSL are dense. Accordingly, in an embodiment, the first sensing area SA1, the second sensing area SA2, and the third sensing area SA3 may be divided in a vertical direction (or the second direction DR2). In addition, the division of the sensing area SA may be variously modified according to a position and/or the number of the sensing electrodes SE.

The plurality of sensing electrodes SE may be implanted in different shapes according to a position in the sensing area SA. For example, among the plurality of sensing electrodes SE, a first sensing electrode SE1 may be positioned in a central portion (for example, the first sensing area SA1) of the sensing area SA and may have a quadrangular shape. A second sensing electrode SE2 may be positioned on a side portion (for example, the second sensing area SA2) of the sensing area SA and may have a quadrangular shape. The third sensing electrode SE3 may be positioned at an outer portion (for example, the third sensing area SA3) of the sensing area SA and may have a sectoral shape. Here, a size of the first sensing electrode SE1 and the second sensing electrode SE2 may be the same, and a size of the third sensing electrode SE3 may be less than that of the second sensing electrode SE2. That is, in an embodiment, as the sensing electrodes SE are positioned outside the sensing area SA, the sensing electrodes SE may have a shape including a curve, and the size of the sensing electrodes SE may be decreased. However, the embodiment is not limited thereto, and according to an embodiment, when the sensing area SA corresponds to a rectangle shape or a square, the sensing electrodes SE may have a rectangular or square shape.

The plurality of sensing lines SSL may extend in one direction to be electrically connected to the plurality of respective sensing electrodes SE. For example, a first sensing line SSL1 of the plurality of sensing lines SSL may be electrically connected to the first sensing electrode SE1, may be partially bent in the second direction DR2, and may extend in the first direction DR1. A second sensing line SSL2 may be electrically connected to the second sensing electrode SE2, may be partially bent in the second direction DR2, and may extend in the first direction DR1. The third sensing line SSL3 may be electrically connected to the third sensing electrode SE3, may be partially bent in the second direction DR2, and may extend in the first direction DR1.

In an embodiment, the same sensing voltage may be applied to each of the plurality of sensing lines SSL, or the reference voltage different from the sensing voltage may be applied to at least some sensing lines SSL. The sensing line SSL to which the reference voltage is applied may vary according to a position of the sensing area SA.

Figure 4:
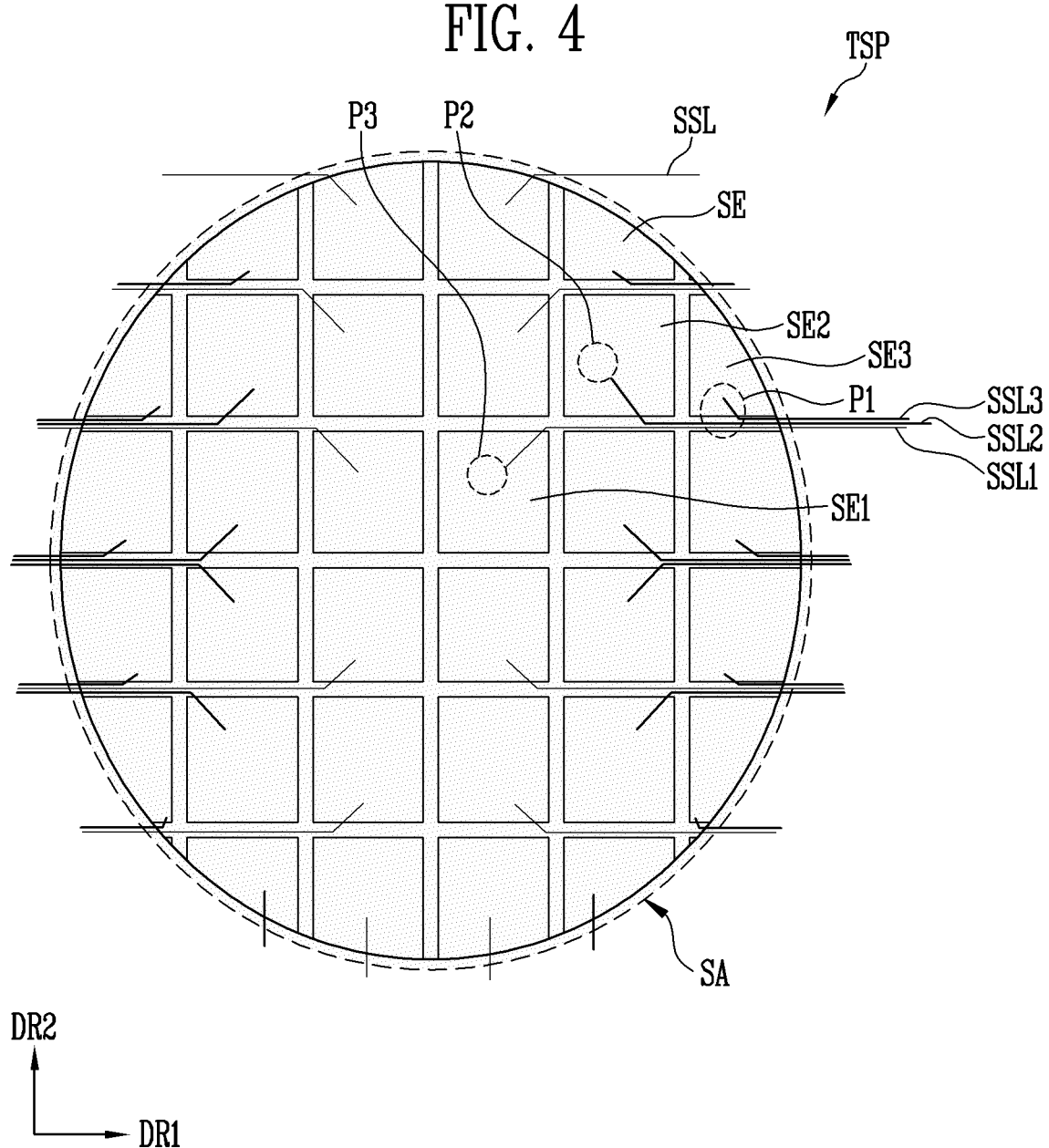
FIGS. 4 to 8 are diagrams illustrating a method of driving a sensing panel according to an embodiment.

Referring to FIG. 4, the same sensing voltage may be applied to each of the plurality of sensing lines SSL.

The same sensing voltage (or sensing signal) may be applied to each of the plurality of sensing lines SSL. Accordingly, the same charge may be charged in the plurality of sensing electrodes SE, and the sensing panel controller 200 (refer to FIG. 1) may sense a sensing electrode of which a capacitance is changed by an external input to identify a position of the external input. Accordingly, in an embodiment, parasitic capacitance between adjacent sensing electrodes may be prevented, and a driving time of the sensing panel TSP may be efficiently used.

In an embodiment, as the plurality of sensing lines SSL extends in one direction, a portion where the sensing lines SSL is densely positioned may occur. In an outer portion (for example, the third sensing area SA3 (refer to FIG. 7)) of the sensing area SA, the sensing lines SSL may be positioned to be dense each other. Accordingly, when the external input is applied to a portion where the sensing lines SSL are positioned to be dense each other, since the same sensing voltage is applied to the sensing lines SSL, a position where the external input is applied may not be accurately sensed. For example, although the external input is applied to a first position P1, since the first sensing line SSL1, the second sensing line SSL2, and the third sensing line SSL3 are densely positioned at the first position P1. It may be incorrectly sensed that the external input is applied to a second position P2 along the second sensing line SSL2 or a third position P3 along the third sensing line SSL3. In an embodiment, the above-described error may be solved by applying the reference voltage different from the sensing voltage to the sensing lines SSL (or the sensing electrodes SE) along the sensing area SA. Here, the reference voltage may be a ground voltage.

Referring to 5 to 7, the sensing voltage may be applied to the plurality of sensing lines SSL according to the position of the sensing area SA, and the reference voltage different from the sensing voltage may be applied to the plurality of sensing lines SSL according to the position of the sensing area SA. That is, the sensing panel controller 200 may sequentially divide and drive the sensing electrodes SE according to the sensing area SA.

Figure 5:
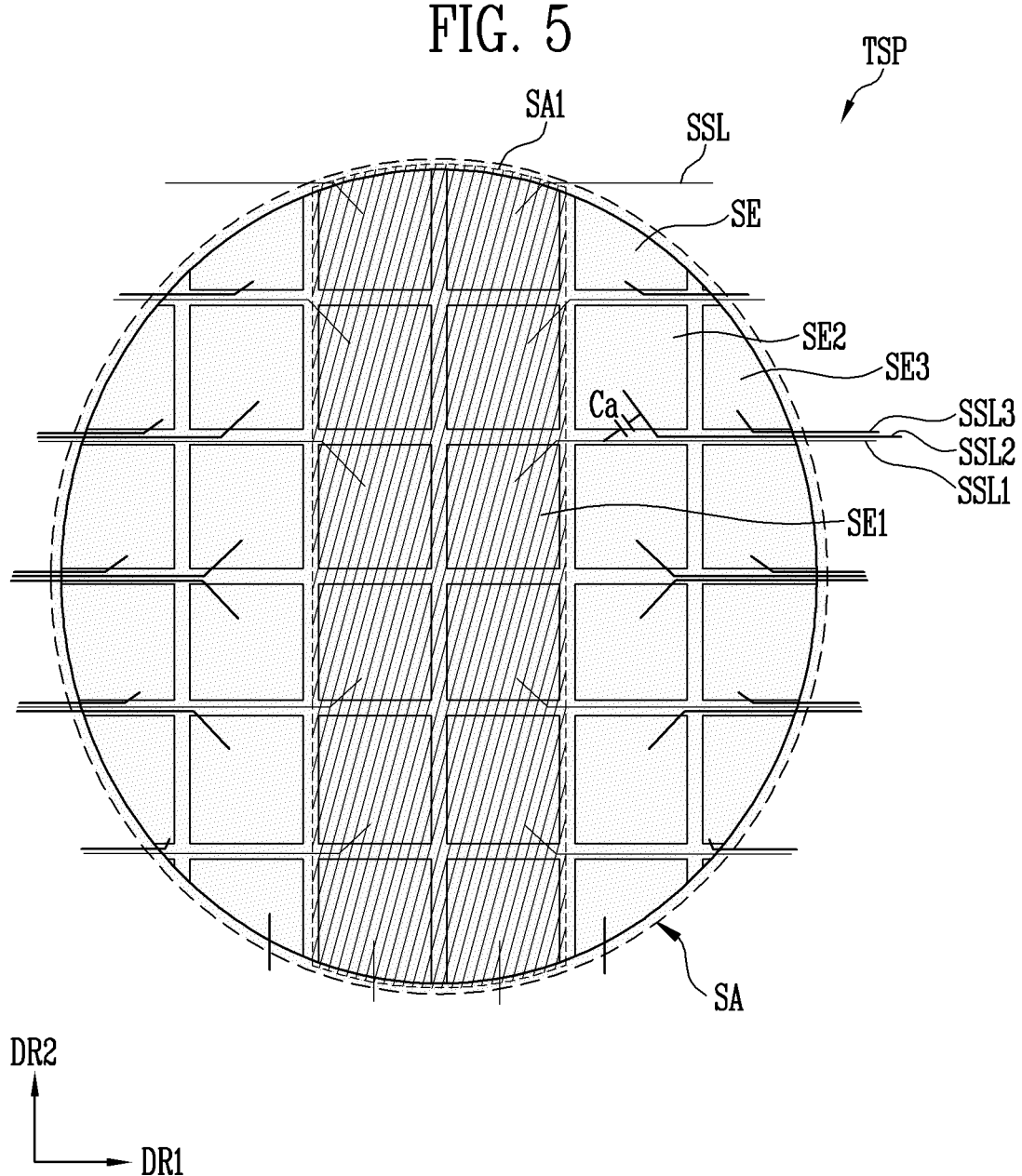

Referring to FIG. 5, the sensing voltage may be applied to the first sensing line SSL1 corresponding to the first sensing area SA1, and the reference voltage may be applied to the remaining sensing lines SSL. That is, the sensing voltage may be applied to the first sensing line SSL1 electrically connected to the first sensing electrode SE1 disposed in the first sensing area SA1, and the reference voltage may be applied to the remaining sensing electrodes SE. For example, a voltage of 3V may be applied to the first sensing line SSL1, and a voltage of 0V may be applied to the second sensing line SSL2 and the third sensing line SSL3. Accordingly, a capacitor Ca according to a voltage difference may be generated between the first sensing line SSL1 and the second sensing line SSL2.

Figure 6:
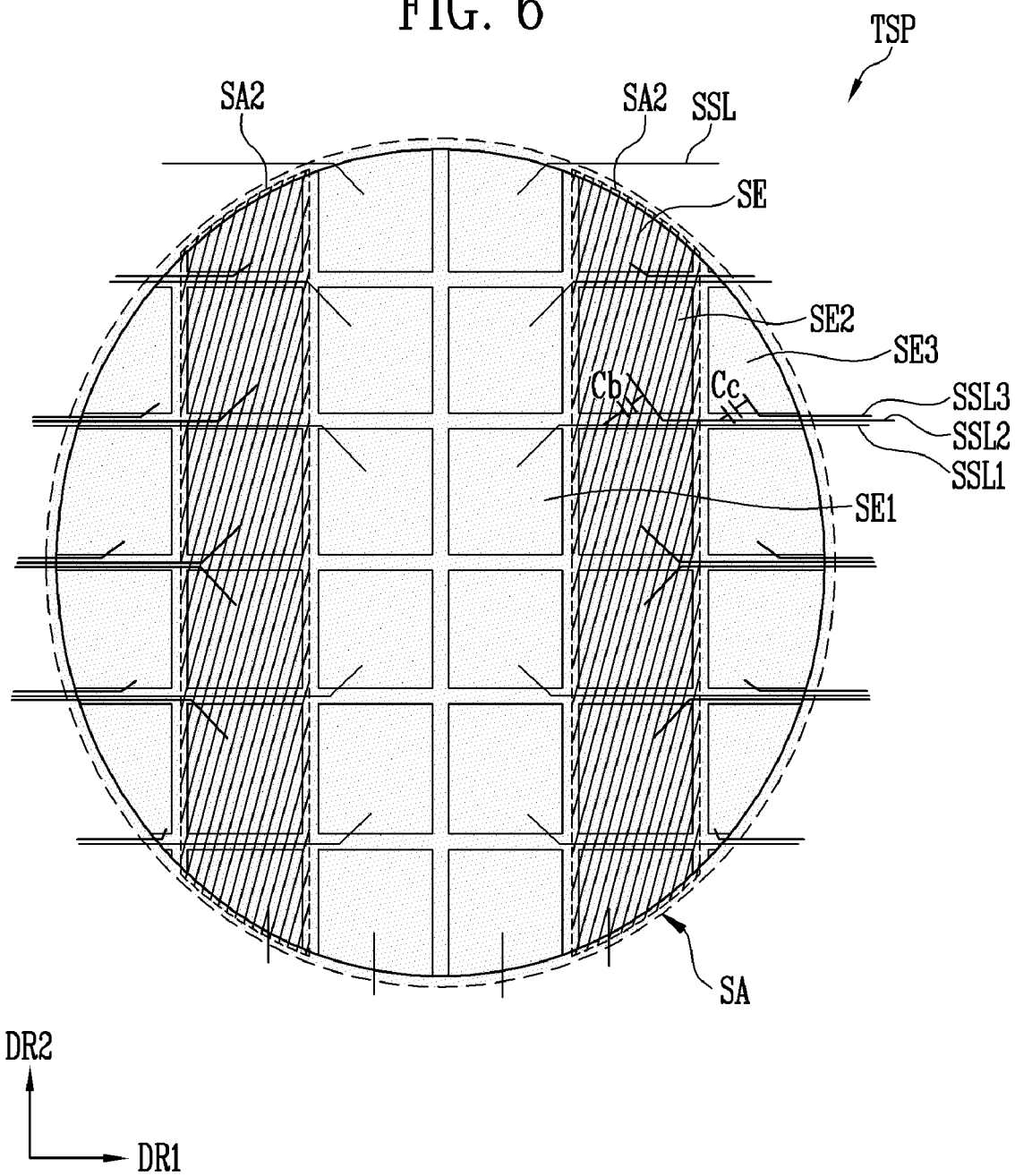

Referring to FIG. 6, the sensing voltage may be applied to the second sensing line SSL2 corresponding to the second sensing area SA2, and the reference voltage may be applied to the remaining sensing lines SSL. That is, the sensing voltage may be applied to the second sensing line SSL2 electrically connected to the second sensing electrode SE2 disposed in the second sensing area SA2, and the reference voltage may be applied to the remaining sensing electrodes SE. For example, a voltage of 3V may be applied to the second sensing line SSL2, and a voltage of 0V may be applied to the first sensing line SSL1 and the third sensing line SSL3. Accordingly, a capacitor Cb according to a voltage difference may be generated between the first sensing line SSL1 and the second sensing line SSL2, and a capacitor Cc according to voltage difference may be generated between the second sensing line SSL2 and the third sensing line SSL3.

Figure 7:
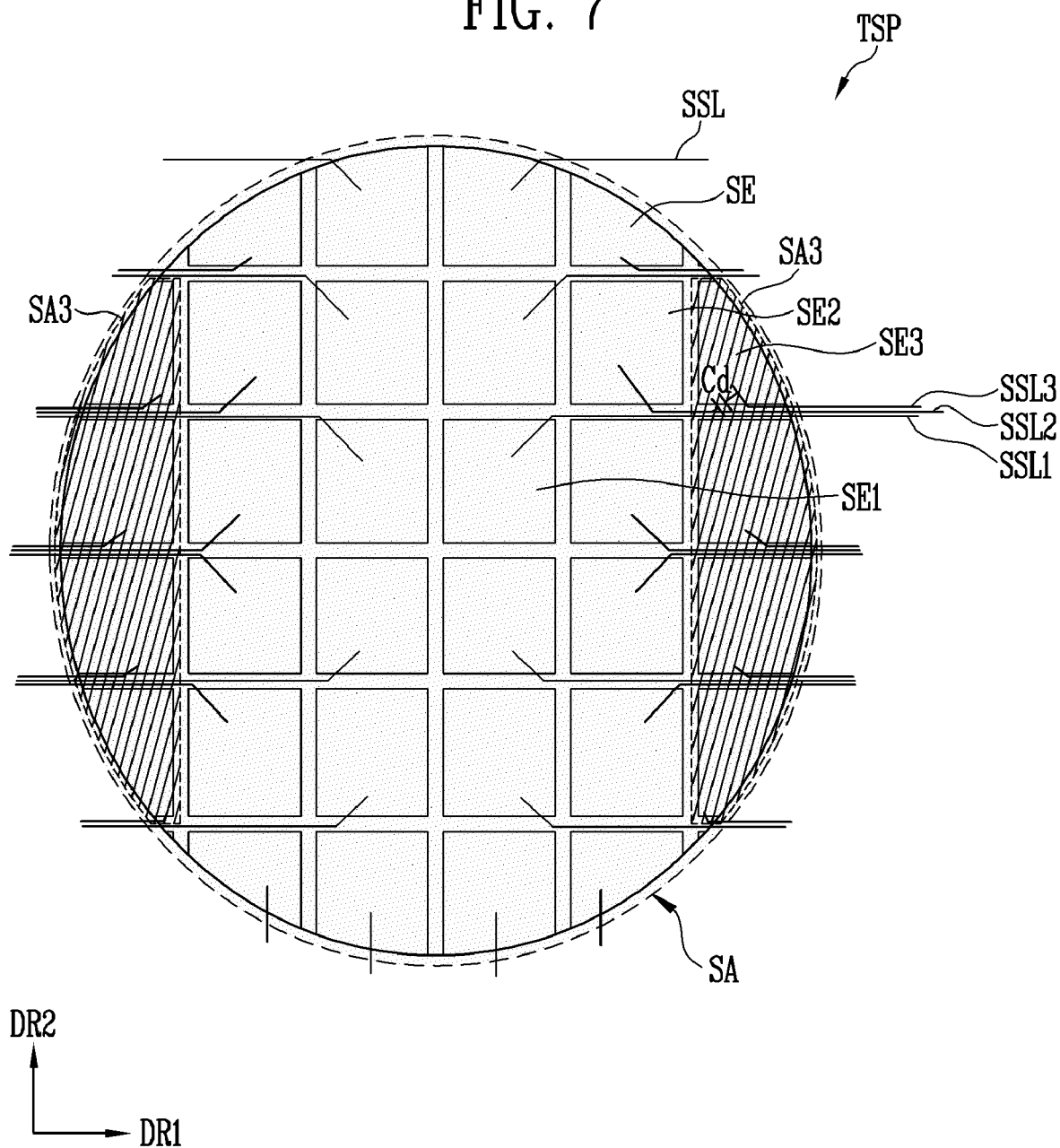

Referring to FIG. 7, the sensing voltage may be applied to the third sensing line SSL3 corresponding to the third sensing area SA3, and the reference voltage may be applied to the remaining sensing lines SSL. That is, the sensing voltage may be applied to the third sensing line SSL3 electrically connected to the third sensing electrode SE3 disposed in the third sensing area SA3, and the reference voltage may be applied to the remaining sensing electrodes SE. For example, a voltage of 3V may be applied to the third sensing line SSL3, and a voltage of 0V may be applied to the first sensing line SSL1 and the second sensing line SSL2. Accordingly, a capacitor Cd according to a voltage difference may be generated between the second sensing line SSL2 and the third sensing line SSL3.

The sensing panel controller 200 may sequentially apply the sensing voltage to the first sensing line SSL1, the second sensing line SSL2, and the third sensing line SSL3 respectively corresponding to the first sensing area SA1, the second sensing area SA2, and the third sensing area SA3. That is, however, the sensing panel controller 200 may sequentially divide and drive the sensing electrodes SE respectively corresponding to the first sensing area SA1, the second sensing area SA2, and the third sensing area SA3 in the sensing area SA. The sensing panel controller 200 may identify that a position where the capacitance change occurs is caused by an input applied to the portion where the sensing lines SSL are dense, due to a capacitor generated by sequentially dividing and driving the sensing electrodes SE (or the sensing area SA). Accordingly, the display device according to an embodiment may check whether the input is applied to the portion where the sensing lines SSL are dense, and may recognize the final sensing coordinate with reference to the position of the portion where the sensing lines SSL are dense. The embodiment is not limited thereto, and according to an embodiment, the reference voltage may be applied only to one of the first sensing line SSL1, the second sensing line SSL2, and the third sensing line SSL3.

Figure 8:
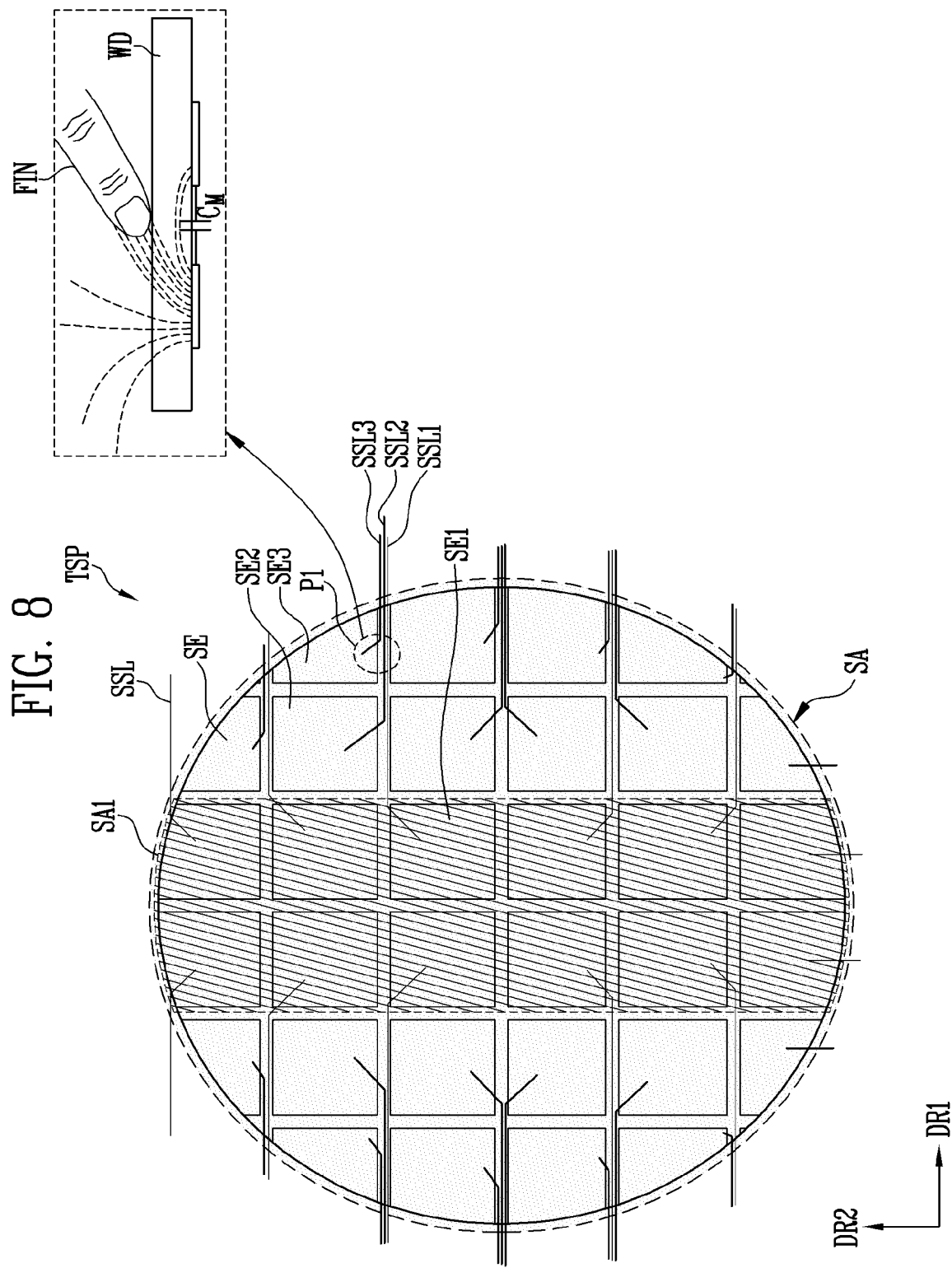

FIG. 8 is a diagram illustrating how the sensing panel controller 200 may sense a corresponding position when an external input is applied to a portion where the sensing lines SSL are dense.

Referring to FIG. 8, when an external input FIN is applied to the first position P1, an electric field and a capacitance formed between the sensing electrodes SE may be checked. Here, the first position P1 may correspond to a portion where the plurality of sensing lines SSL are dense. The shown window WD may be the same configuration as the window WD described with reference to FIG. 2. Although the external input FIN is shown by the user's finger, the embodiment is not limited thereto, and various inputs such as an external pen may correspond to the external input FIN.

In an embodiment, when the sensing voltage is applied to the first sensing line SSL1 corresponding to the first sensing area SA1, and the reference voltage is applied to the remaining sensing lines (for example, the second sensing line SSL2 and the third sensing line SSL3), in a case where the external input is applied to the first position P1, a capacitance CM may be formed between the first sensing line SSL1 and the second sensing line SSL2 and/or the third sensing line SSL3 due to a voltage difference between the first sensing line SSL1 and the second sensing line SSL2 and/or the third sensing line SSL3. The sensing panel controller 200 may sense the external input using such a change of the capacitance CM, that is, a mutual capacitance method. Accordingly, in an embodiment, when the external input is applied to the portion of the sensing area SA where the plurality of sensing lines SSL are dense, the sensing area SA may be divided and driven. Therefore, the external input may be sensed by sensing a change of a capacitance formed due to a voltage difference between the sensing lines SSL. Therefore, the display device according to an embodiment may improve an error of inaccurately sensing the external input applied to the portion of the sensing area where the sensing lines are dense.

Hereinafter, a method of driving a display device according to an embodiment is described with reference to FIG. 9.

Figure 9:
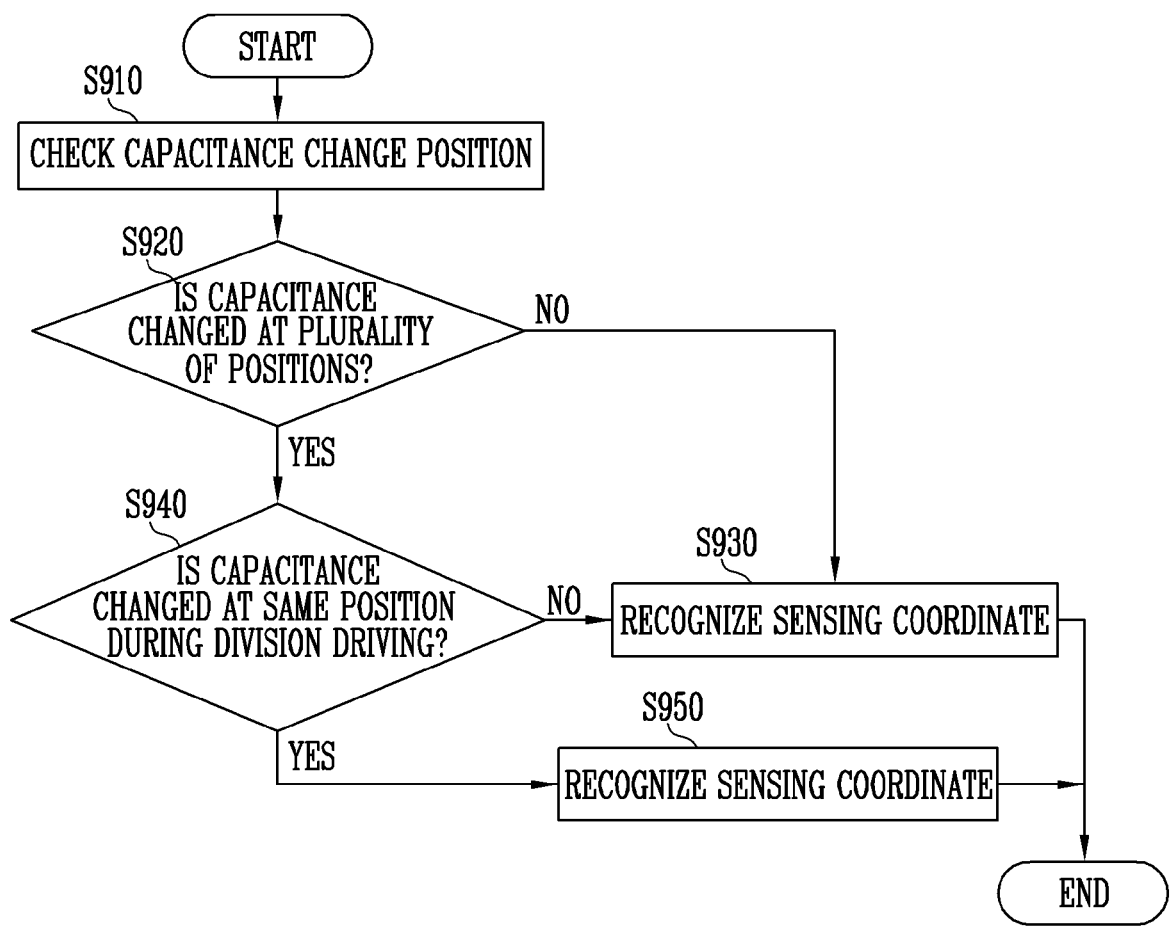
FIG. 9 is a flowchart illustrating a method of driving a display device according to an embodiment.

FIG. 9 is a flowchart illustrating a method of driving a display device according to an embodiment. Hereinafter, the embodiment as reference with respect to FIG. 9 is described with reference to FIGS. 1 to 8 together.

Referring to FIG. 9, the method of driving the display device according to an embodiment may include identifying the initial position where the capacitance change occurs on the sensing panel TSP (or the sensing area SA) (S910), determining whether the capacitance change occurs at a plurality of positions (S920), checking whether the capacitance change occurs at the same position as the initial position through division driving of the sensing electrodes SE (S940), and recognizing the final sensing coordinate (S930 and S950).

First, the sensing panel controller 200 may identify the initial position where the capacitance change occurs on the sensing panel TSP (or the sensing area SA) (S910). The occurrence of the capacitance change at a predetermined position on the sensing area SA may mean that a predetermined input is applied from the outside. At this time, the sensing panel controller 200 may drive the sensing panel TSP so that the same sensing voltage is applied to the plurality of electrodes SE.

The sensing panel controller 200 may determine whether the initial position where the capacitance change occurs in the sensing area SA corresponds to the plurality of positions (S920).

When the sensing panel controller 200 determines that the capacitance change occurs at one position, the sensing panel controller 200 may recognize the corresponding position as the final sensing coordinate (S930). At this time, the sensing panel controller 200 may recognize the sensing coordinate by driving the sensing panel TSP so that the same sensing voltage is applied to the plurality of electrodes SE.

When the sensing panel controller 200 determines that the capacitance change occurs at the plurality of positions, the sensing panel controller 200 may check whether the capacitance change occurs at the same position as the first determined position, by sequentially dividing and driving the sensing electrodes SE (S940). A method of sequentially dividing and driving the sensing electrodes SE by the sensing panel controller 200 is described with reference to FIGS. 5 to 7 described above.

When the sensing panel controller 200 determines that the capacitance change does not occur at the same position as the initially determined position, by dividing and driving the sensing electrodes SE, the sensing panel controller 200 may recognize the initial position as the final sensing coordinate (S930). This case may correspond to a case where an input is not applied to the portion where the sensing lines SSL are dense in the sensing area SA.

On the other hand, when the sensing panel controller 200 determines that the capacitance change occurs at the same position as the first determined position, by dividing and driving the sensing electrodes SE, the sensing panel controller 200 may determine that corresponding positions occur as an input is applied to the portion where the sensing lines SSL are dense. At this time, the sensing panel controller 200 may recognize the final sensing coordinate with reference to the initially identified position and the position identified according to the division driving (S950).

Therefore, the method of driving the display device according to an embodiment may improve an error of inaccurately sensing the external input applied to the portion of the sensing area where the sensing lines are dense. Accordingly, sensing accuracy of the display device may be improved.

Hereinafter, the method of driving the display device described with reference to FIG. 9 is described in detail with reference to FIGS. 10 to 12.

Figure 10:
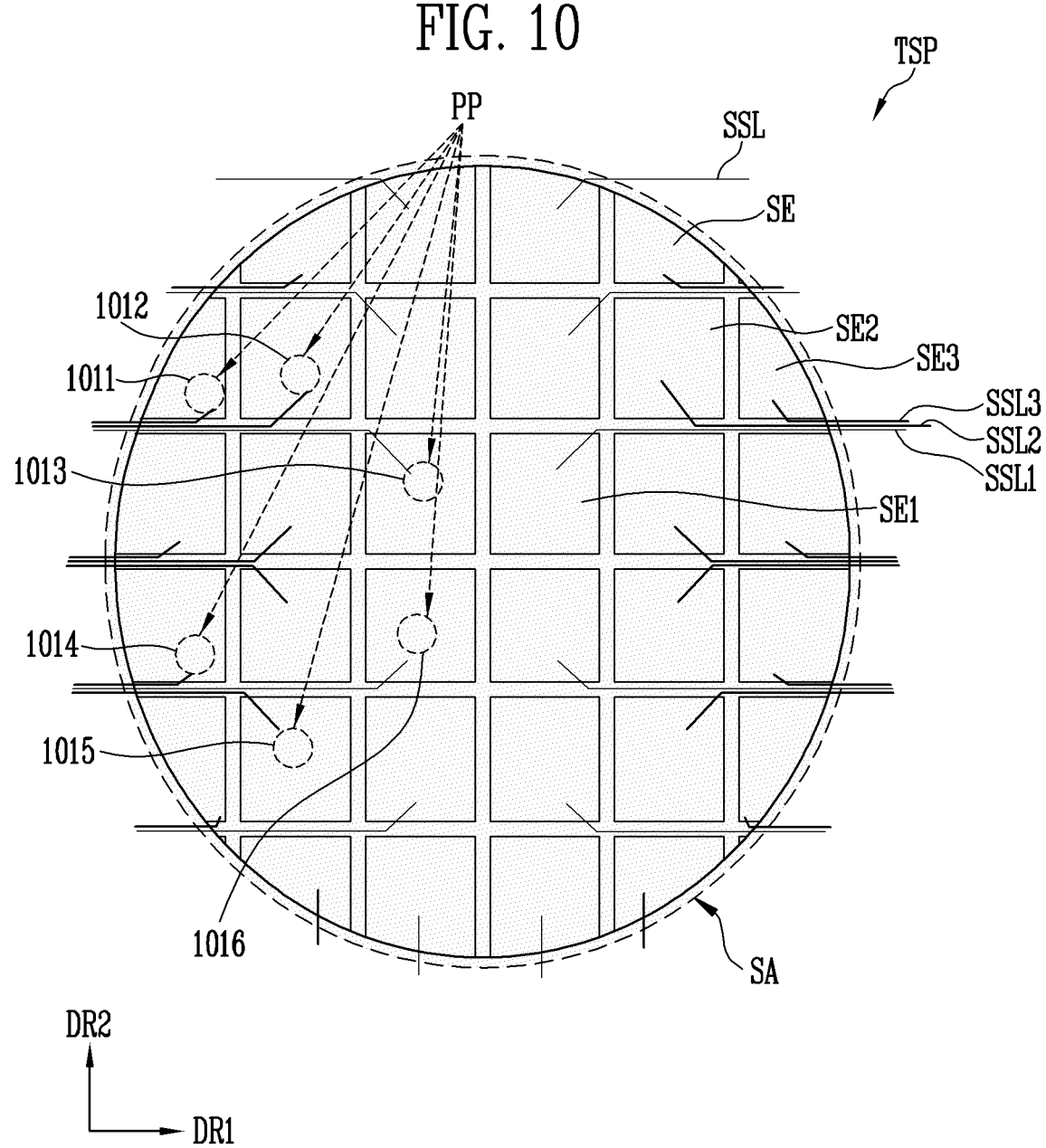
FIGS. 10 to 12 are diagrams illustrating the driving method of FIG. 9.
Figure 11:
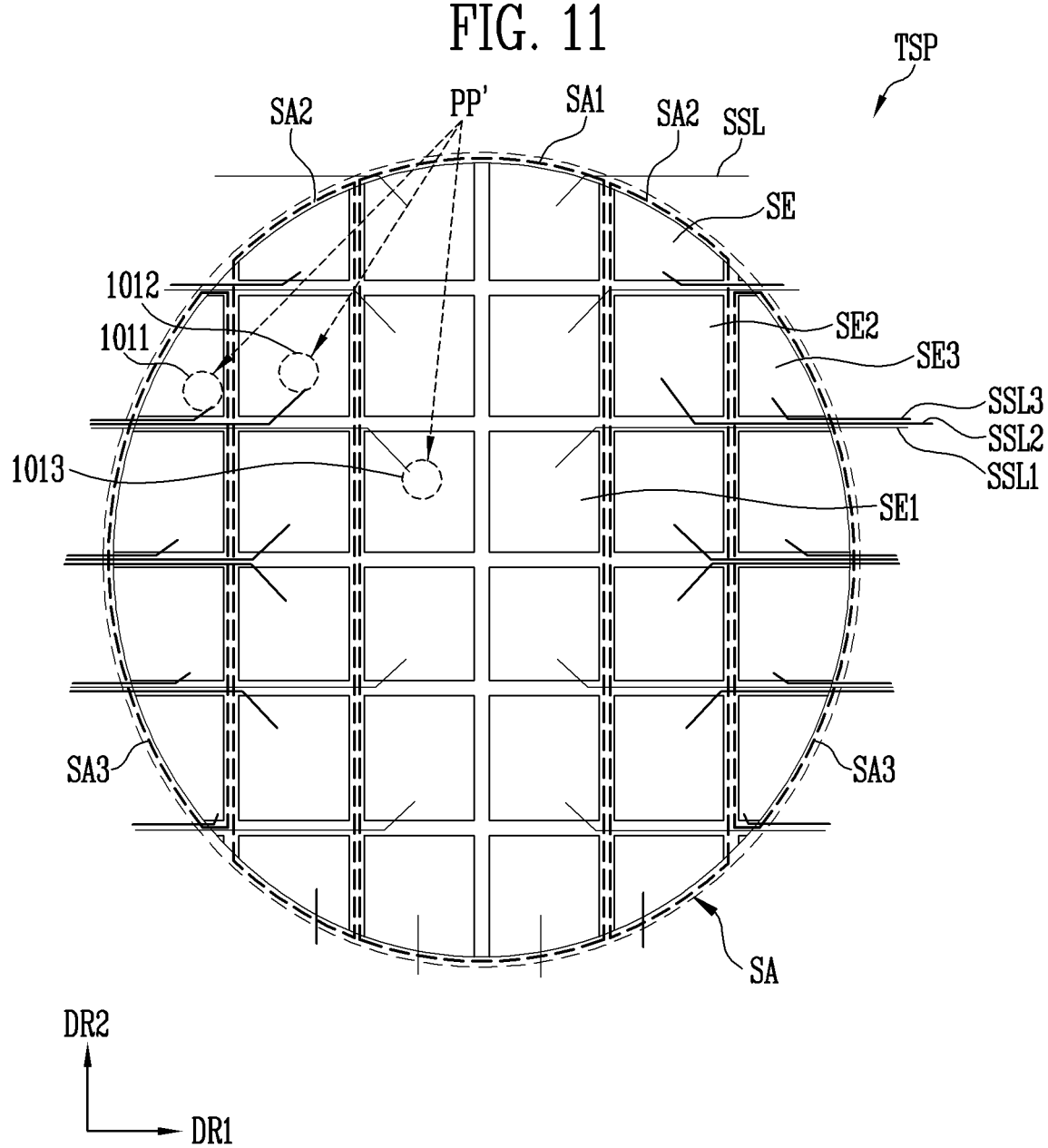
Figure 12:
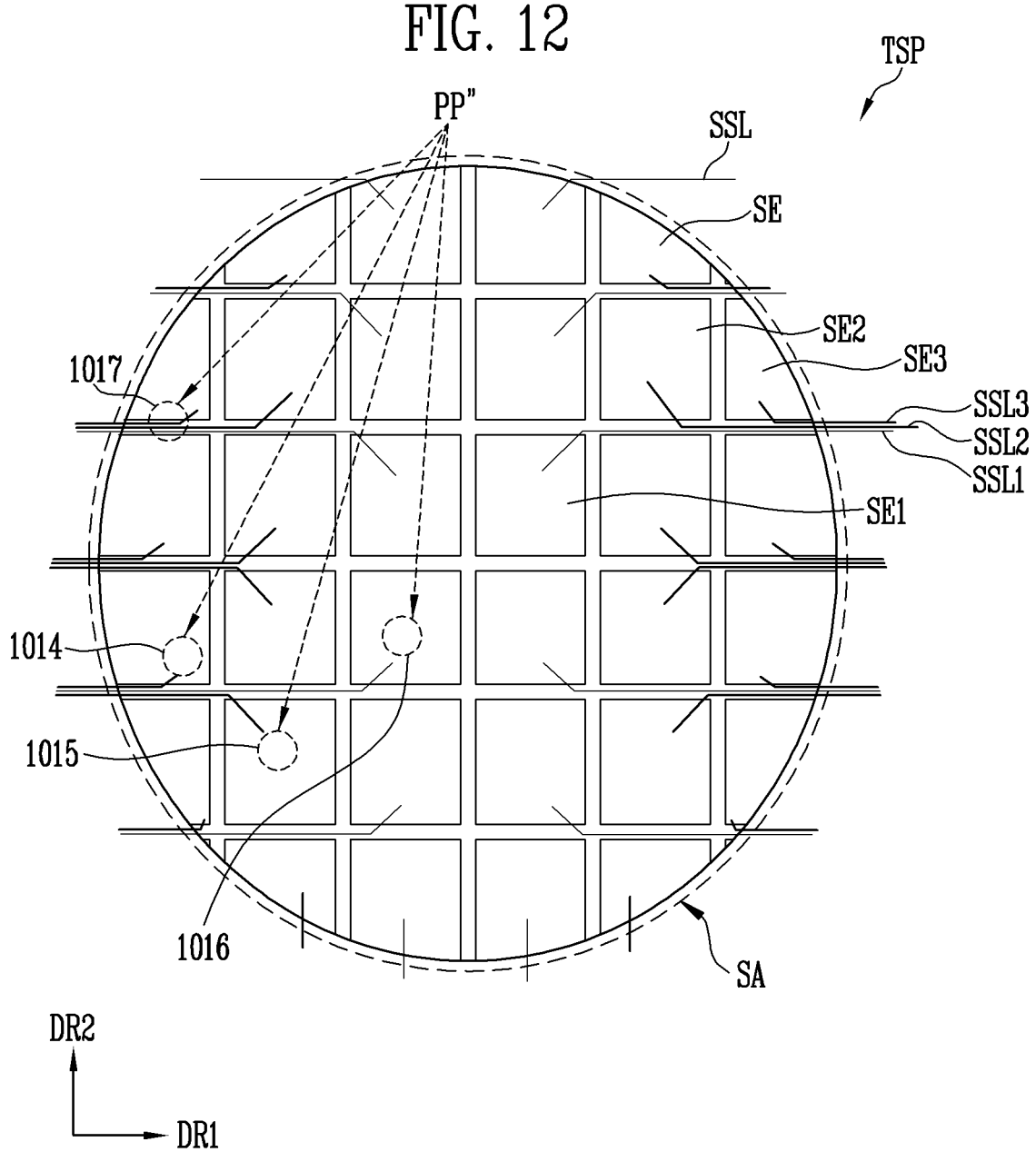

FIGS. 10 to 12 are diagrams illustrating the driving method of FIG. 9.

Referring to FIG. 10, the sensing panel controller 200 may apply the same sensing voltage to the plurality of electrodes SE to identify the initial position where the capacitance change occurs in the sensing area SA. For example, the sensing panel controller 200 may check a first position 1011, a second position 1012, a third position 1013, a fourth position 1014, a fifth position 1015, and a sixth position 1016 as an initial position PP. Here, the first position 1011, the second position 1012, and the third position 1013 may be due to the external input applied to the portion where the plurality of sensing lines SSL are dense, and the fourth position 1014, the fifth position 1015, and the sixth position 1016 may be due to an external input applied to a corresponding position.

Thereafter, when the sensing panel controller 200 determines that the capacitance change occurs at a plurality of positions (for example, the first position 1011, the second position 1012, the third position 1013, the fourth position 1014, the fifth position 1015, and the sixth position 1016) in the sensing area SA, the sensing panel controller 200 may sequentially divide and drive the sensing electrodes SE. Here, the sensing panel controller 200 may sequentially divide and drive the sensing electrodes SE (or the sensing area SA) to fine whether a position due to the input applied to the portion where the plurality of sensing lines SSL is dense exists among the plurality of positions.

Referring to FIG. 11, the sensing panel controller 200 may sequentially divide and drive the sensing area SA. For example, the sensing panel controller 200 may sequentially divide and drive the sensing area SA in an order of the first sensing area SA1, the second sensing area SA2, and the third sensing area SA3. Specifically, the sensing panel controller 200 may sequentially apply the sensing voltage only to the first sensing line SSL1 corresponding to the first sensing area SA1, may apply the sensing voltage only to the second sensing line SSL2 corresponding to the second sensing area SA2, and may apply the sensing voltage only to the third sensing line SSL3 corresponding to the third sensing area SA3. The sensing panel controller 200 may check that the position where the capacitance change occurs is due to the input applied to the portion where the sensing lines SSL are dense, due to the capacitor generated as the sensing voltage is sequentially applied to the first sensing lines SSL1 to the third sensing line SSL3 corresponding to the first sensing area SA1 to the third sensing area SA3, and the reference voltage is applied to the remaining sensing lines SSL. At this time, the sensing panel controller 200 may check whether the capacitance change occurs at the same position as the first determined position through division driving and sampling processing. For example, the sensing panel controller 200 may determine that the capacitance change occurs at the first position 1011, the second position 1012, and the third position 1013 through the division driving and the sampling processing of the sensing area SA.

Thereafter, when the capacitance change occurs at the same position as the first determined position, the sensing panel controller 200 may determine that a corresponding position PP' is generated as the input is applied to the portion where the sensing lines SSL are dense. For example, the first position 1011, the second position 1012, and the third position 1013 may be the same positions as the first determined positions, and the sensing panel controller 200 may determine that the first position 1011, the second position 1012, and the third position 1013 are generated according to the input applied to the portion where the first sensing line SSL1, the second sensing line SSL2, and the third sensing line SSL3 are dense.

Referring to FIG. 12, the sensing panel controller 200 may recognize the final sensing coordinate with reference to the initially identified position and the position identified according to the division driving. That is, the sensing panel controller 200 may recognize the final sensing coordinate PP" with reference to the initially identified position PP and the position PP' identified according to the division driving. For example, the sensing panel controller 200 may initially identify the first position 1011, the second position 1012, the third position 1013, the fourth position 1014, the fifth position 1015, and the sixth position 1016, and identify the first position 1011, the second position 1012, and the third position 1013 where the capacitance is changed according to the division driving. Therefore, the sensing panel controller 200 may determine that the initially identified first position 1011, second position 1012, and third position 1013 are generated according to the input applied to the portion where the sensing lines SSL are dense to correct the first position 1011, the second position 1012, and the third position 1013 into a seventh position 1017, and may recognize the final sensing coordinate together with the fourth position 1014, the fifth position 1015, and the sixth position 1016.

Therefore, the method of driving the display device according to an embodiment may improve an error of inaccurately sensing the external input applied to the portion of the sensing area where the sensing lines are dense. Accordingly, sensing accuracy of the display device may be improved.

In FIGS. 10 to 12, when an external input does not exist in the portion where the sensing lines SSL are dense, the sensing panel controller 200 may check the initial position that the capacitance change occurs at the fourth position 1014, the fifth position 1015, and the sixth position 1016 of the sensing area SA. Thereafter, the sensing panel controller 200 may sequentially divide and drive the sensing electrodes SE to check whether the capacitance change occurs at the same position as the first determined position. When the capacitance change does not exist at the fourth position 1014, the fifth position 1015, and the sixth position 1016, the sensing panel controller 200 may determine that the external input does not exist in the portion where the sensing lines SSL are dense, and may recognize the initial positions (that is, the fourth position 1014, the fifth position 1015, and the sixth position 1016) as the final sensing coordinate.

Hereinafter, a method of driving a sensing panel according to an embodiment is described with reference to FIGS. 13 and 14.

Figure 13:
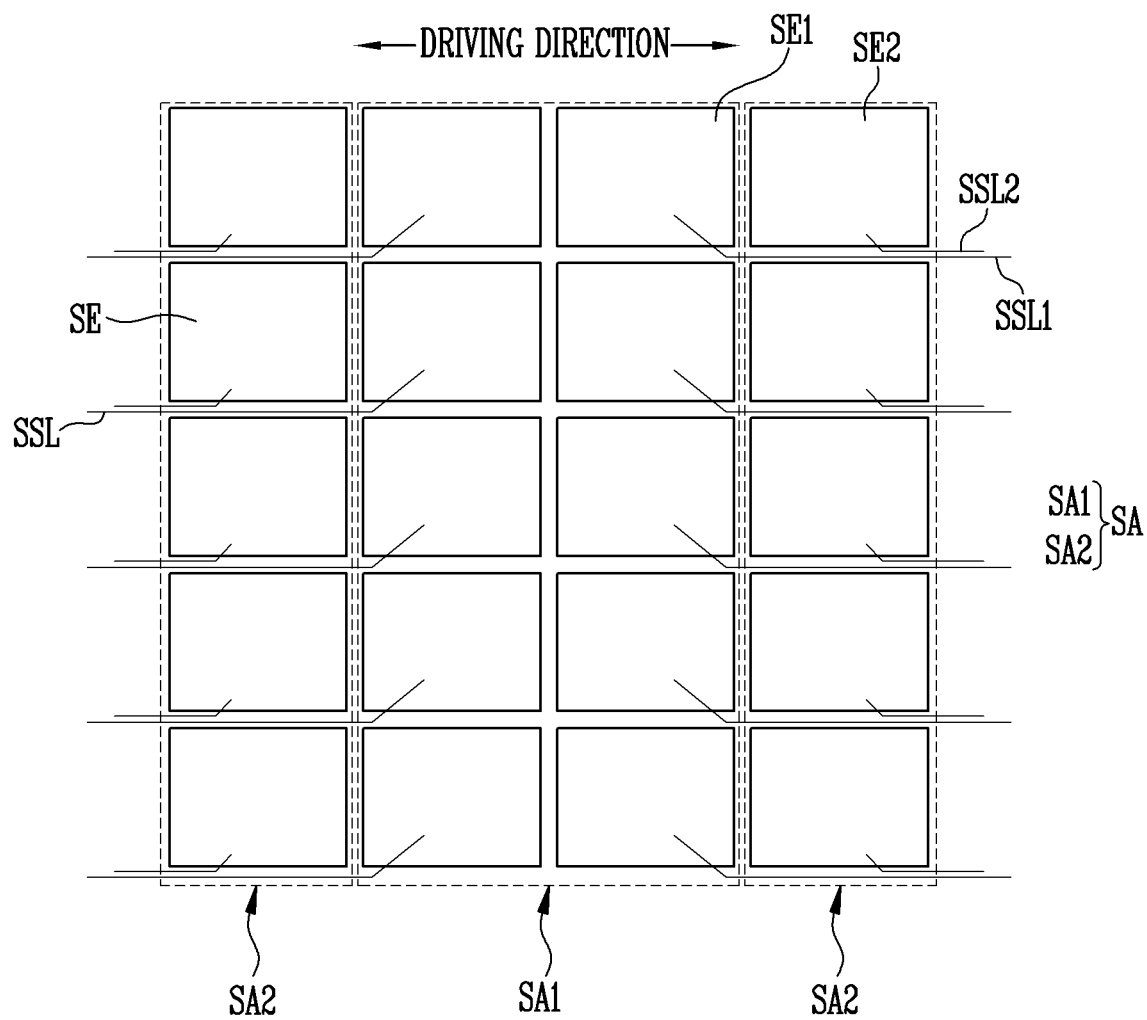
FIGS. 13 and 14 are diagrams illustrating a method of driving a sensing panel according to an embodiment.
Figure 14:
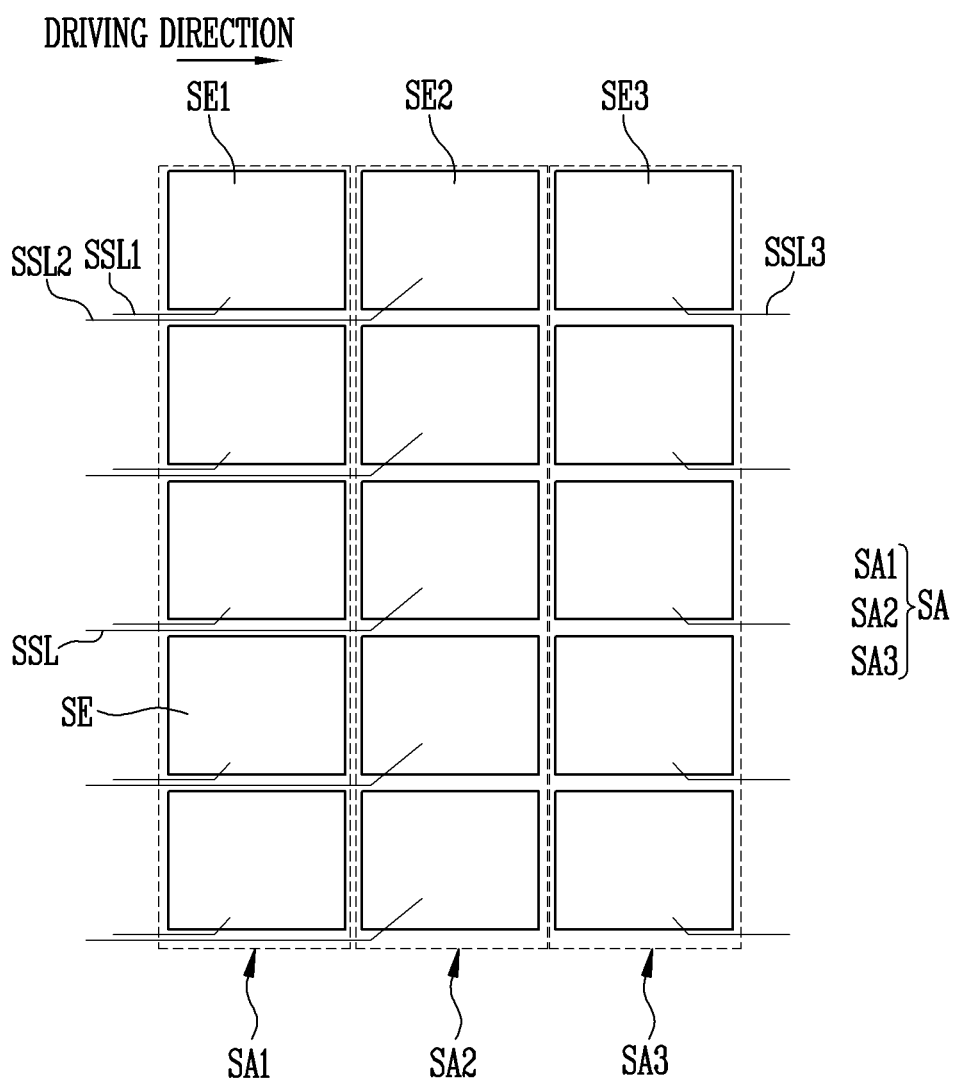

FIGS. 13 and 14 are diagrams illustrating a method of driving a sensing panel according to an embodiment. Since FIGS. 13 and 14 have parts similar to those of FIGS. 4 to 7, in the following description, a repetitive description is omitted for sake of brevity, and differences are mainly described.

Referring to FIGS. 13 and 14, the sensing panel TSP according to an embodiment may include the plurality of sensing electrodes SE and the plurality of sensing lines SSL disposed in the quadrangular sensing area SA.

The plurality of sensing electrodes SE may be positioned to be spaced apart from each other, and may have different sizes and/or shapes to correspond to the circular sensing area SA. The sensing area SA may include a first sensing area SA1 and a second sensing area SA2, and may include a first sensing area SA1, a second sensing area SA2, and a third sensing area SA3.

The plurality of sensing electrodes SE may be implemented in a quadrangular shape. The size and/or shape of the sensing electrodes SE may be the same. However, the embodiment is not limited thereto, and according to an embodiment, the size and/or the shape of the sensing electrodes SE may be different according to the sensing area SA.

In an embodiment, the same sensing voltage may be applied to each of the plurality of sensing lines SSL, or the reference voltage different from the sensing voltage may be applied to at least some sensing lines SSL. The sensing line SSL to which the reference voltage is applied may vary according to the position of the sensing area SA. That is, the sensing panel controller 200 may sequentially divide and drive the sensing electrodes SE according to the sensing area SA.

Referring to FIG. 13, the same sensing voltage (or sensing signal) may be applied to each of the plurality of sensing lines SSL. In addition, the reference voltage may be applied to the plurality of sensing lines SSL according to the corresponding sensing area SA.

For example, the sensing voltage may be applied to the first sensing line SSL1 corresponding to the first sensing area SA1, and the reference voltage may be applied to the remaining sensing lines SSL. At this time, the sensing voltage may be applied to the first sensing electrode SE1 disposed in the first sensing area SA1, and the reference voltage may be applied to the remaining sensing electrodes SE. Thereafter, the sensing voltage may be applied to the second sensing line SSL2 corresponding to the second sensing area SA2, and the reference voltage may be applied to the remaining sensing lines SSL. At this time, the sensing voltage may be applied to the second sensing electrode SE2 disposed in the second sensing area SA2, and the reference voltage may be applied to the remaining sensing electrodes SE. That is, in the sensing panel TSP according to an embodiment, the sensing electrodes SE may be sequentially divided and driven according to a predetermined driving direction (for example, in both directions in the first direction DR1).

Referring to FIG. 14, the same sensing voltage (or sensing signal) may be applied to each of the plurality of sensing lines SSL. In addition, the reference voltage may be applied to the plurality of sensing lines SSL according to the corresponding sensing area SA.

For example, the sensing voltage may be applied to the first sensing line SSL1 corresponding to the first sensing area SA1, and the reference voltage may be applied to the remaining sensing lines SSL. At this time, the sensing voltage may be applied to the first sensing electrode SE1 disposed in the first sensing area SA1, and the reference voltage may be applied to the remaining sensing electrodes SE. Thereafter, the sensing voltage may be applied to the second sensing line SSL2 corresponding to the second sensing area SA2, and the reference voltage may be applied to the remaining sensing lines SSL. At this time, the sensing voltage may be applied to the second sensing electrode SE2 disposed in the second sensing area SA2, and the reference voltage may be applied to the remaining sensing electrodes SE. In addition, the sensing voltage may be applied to the third sensing line SSL3 corresponding to the third sensing area SA3, and the reference voltage may be applied to the remaining sensing lines SSL. At this time, the sensing voltage may be applied to the third sensing electrode SE3 disposed in the third sensing area SA3, and the reference voltage may be applied to the remaining sensing electrodes SE. That is, in the sensing panel TSP according to an embodiment, the sensing electrodes SE may be sequentially divided and driven according to a predetermined driving direction (for example, one direction in the first direction DR1).

In an embodiment, when the external input is applied to the portion of the sensing area SA where the plurality of sensing lines SSL are dense, the sensing area SA may be divided and driven. Therefore, the external input may be sensed by sensing the change of the capacitance formed due to the voltage difference between the sensing lines SSL. Accordingly, the display device according to an embodiment may improve an error of inaccurately sensing the external input applied to the portion of the sensing area where the sensing lines are dense.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display panel configured to display an image;
   a sensing panel that at least partially overlaps the display panel and that includes a sensing area and a non-sensing area;
   a sensing panel controller configured to drive the sensing panel;
   a plurality of sensing electrodes disposed in the sensing area; and
   a plurality of sensing lines electrically connected to the plurality of sensing electrodes, respectively,
   wherein the sensing panel controller is configured to apply the same sensing voltage to each of the plurality of sensing lines or to apply a reference voltage different from the sensing voltage to at least some sensing lines among the plurality of sensing lines,
   wherein the plurality of sensing lines are positioned to extend in one direction in the sensing area and the non-sensing area,
   wherein the sensing area includes a first sensing area, a second sensing area, and a third sensing area divided in a direction perpendicular to a direction in which the plurality of sensing lines are dense, and
   wherein the sensing panel controller is configured to sequentially divide and drive the first sensing area, the second sensing area, and the third sensing area.

2. The display device of claim 1, wherein the sensing panel controller is configured to apply the reference voltage to the at least some sensing lines in response to a position of the sensing area.

3. The display device of claim 1, wherein the plurality of sensing lines include a first sensing line, a second sensing line, and a third sensing line electrically connected to sensing electrodes corresponding to the first sensing area, the second sensing area, and the third sensing area.

4. The display device of claim 3, wherein the sensing panel controller is configured to apply the sensing voltage to the first sensing line corresponding to the first sensing area and applies the reference voltage to remaining sensing lines.

5. The display device of claim 4, wherein the sensing panel controller is configured to apply the sensing voltage to the second sensing line corresponding to the second sensing area and applies the reference voltage to the remaining sensing lines.

6. The display device of claim 5, wherein the sensing panel controller is configured to apply the sensing voltage to the third sensing line corresponding to the third sensing area and applies the reference voltage to the remaining sensing lines.

7. The display device of claim 6, wherein the sensing panel controller is configured to apply the same sensing voltage to the plurality of sensing lines to check an initial position where a capacitance change occurs on the sensing area.

8. The display device of claim 7, wherein the sensing panel controller is configured to determine whether the initial position where the capacitance change occurs in the sensing area corresponds to a plurality of positions, and when it is determined that the capacitance change occurs in the plurality of positions, the sensing panel controller is configured to sequentially divide and drive the sensing area.

9. The display device of claim 8, wherein the sensing panel controller is configured to sequentially divide and drive the sensing area, and when the capacitance change occurs in the same position as the initial position, the sensing panel controller is configured to determine that an external input is applied to a portion where the plurality of sensing lines are dense.

10. The display device of claim 9, wherein the sensing panel controller is configured to recognize a final sensing coordinate with reference to the initial position and a position of the portion where the plurality of sensing lines are dense.

11. A method of driving a display device comprising a display panel that is configured to an image, a sensing panel configured to at least partially overlap the display panel and that includes a sensing area and a non-sensing area, a sensing panel controller configured to drive the sensing panel, a plurality of sensing electrodes disposed in the sensing area, and a plurality of sensing lines electrically connected to the plurality of sensing electrodes, respectively, the method comprising:
   checking, by the sensing panel controller, an initial position where a capacitance change occurs on the sensing area;
   determining, by the sensing panel controller, whether the capacitance change occurs at a plurality of positions in the sensing area;
   checking, by the sensing panel controller, whether the capacitance change occurs at the same position as the initial position through division driving of the plurality of sensing electrodes; and recognizing, by the sensing panel controller, a final sensing coordinate in the sensing area, wherein the plurality of sensing lines are positioned to extend in one direction in the sensing area and the non-sensing area, wherein the sensing area includes a first sensing area, a second sensing area, and a third sensing area divided in a direction perpendicular to a direction in which the plurality of sensing lines are dense, wherein the plurality of sensing electrodes include first sensing electrodes, second sensing electrodes, and third sensing electrodes corresponding to the first sensing area, the second sensing area, and the third sensing area, and wherein when it is determined that the capacitance change occurs in the plurality of positions of the initial position, the sensing panel controller sequentially divides and drives the first sensing electrodes, the second sensing electrodes, and the third sensing electrodes.

12. The method of claim 11, wherein when checking the initial position where the capacitance change occurs on the sensing area, the sensing panel controller applies the same sensing voltage to the plurality of sensing electrodes.

13. The method of claim 11, wherein when the sensing panel controller determines that the capacitance change occurs at one position of the initial position, the sensing panel controller recognizes the corresponding position as the final sensing coordinate.

14. The method of claim 12, wherein when the sensing panel controller determines that the capacitance change does not occur at a same position as the initial position through the division driving, the sensing panel controller recognizes the initial position as the final sensing coordinate.

15. The method of claim 12, wherein when the sensing panel controller determines that the capacitance change occurs at a same position as the initial position through the division driving, the sensing panel controller determines that the corresponding position is generated as an input is applied to a portion where the plurality of sensing lines are dense.

16. The method of claim 15, wherein the sensing panel controller recognizes the final sensing coordinate with reference to the initial position and a position identified according to the division driving.

* * * * *